(12) United States Patent
Chang et al.

(10) Patent No.: US 11,275,991 B2
(45) Date of Patent: Mar. 15, 2022

(54) COORDINATED HETEROGENEOUS PROCESSING OF TRAINING DATA FOR DEEP NEURAL NETWORKS

(71) Applicant: Nokia Technologies Oy, Espoo (FI)

(72) Inventors: Fangzhe Chang, Edison, NJ (US); Dong Liu, Warren, NJ (US); Thomas Woo, Short Hills, NJ (US)

(73) Assignee: Nokia Technologies Oy, Espoo (FI)

( * ) Notice: Subject to any disclaimer, the term of this patent is extended or adjusted under 35 U.S.C. 154(b) by 943 days.

(21) Appl. No.: 15/945,647

(22) Filed: Apr. 4, 2018

(65) Prior Publication Data
US 2019/0311257 A1  Oct. 10, 2019

(51) Int. Cl.
*G06N 3/04* (2006.01)
*G06N 3/08* (2006.01)
*G06N 3/063* (2006.01)
*G06F 9/50* (2006.01)

(52) U.S. Cl.
CPC ............ *G06N 3/063* (2013.01); *G06N 3/04* (2013.01); *G06N 3/08* (2013.01); *G06F 9/5044* (2013.01); *G06F 9/5088* (2013.01); *G06N 3/0454* (2013.01)

(58) Field of Classification Search
CPC ........... G06N 3/08; G06N 3/04; G06N 3/063; G06N 3/0454; G06F 9/5044; G06F 9/5088
USPC ...................................................... 706/1–62
See application file for complete search history.

(56) References Cited

U.S. PATENT DOCUMENTS

| | | | |
|---|---|---|---|
| 11,070,949 B2 * | 7/2021 | Gross | H04W 4/029 |
| 2011/0161972 A1 | 6/2011 | Dillenberger et al. | |
| 2014/0026144 A1 * | 1/2014 | Pack | G06F 9/505 718/105 |
| 2015/0324690 A1 * | 11/2015 | Chilimbi | G06N 3/08 706/25 |
| 2017/0091668 A1 * | 3/2017 | Kadav | G06N 20/00 |
| 2017/0220949 A1 | 8/2017 | Feng et al. | |
| 2018/0349472 A1 * | 12/2018 | Kohlschuetter | G06F 16/3322 |
| 2019/0095794 A1 * | 3/2019 | Aldana Lopez | G06N 20/00 |
| 2019/0147318 A1 * | 5/2019 | Howard | G06N 3/08 706/27 |

(Continued)

FOREIGN PATENT DOCUMENTS

EP  3139314 A1  3/2017

OTHER PUBLICATIONS

Gupta S., et al., (2016) "Model Accuracy and Runtime Tradeoff in Distributed Deep Learning: A Systematic Study" Retrieved from https://ieeexplore.ieee.org/document/7837841 (Year: 2016).*

(Continued)

*Primary Examiner* — Brandon S Cole
(74) *Attorney, Agent, or Firm* — Duft & Bornsen, PC

(57) ABSTRACT

Systems and methods for training neural networks. One embodiment is a system that includes a memory configured to store samples of training data for a Deep Neural Network (DNN), and a distributor. The distributor identifies a plurality of work servers provisioned for training the DNN by processing the samples via a model of the DNN, receives information indicating Graphics Processing Unit (GPU) processing powers at the work servers, determines differences in the GPU processing powers between the work servers based on the information, and allocates the samples among the work servers based on the differences.

20 Claims, 10 Drawing Sheets

(56) References Cited

U.S. PATENT DOCUMENTS

2019/0339687 A1* 11/2019 Celia ................. G05B 23/0264

OTHER PUBLICATIONS

Deep Learning; Wikipedia Mar. 7, 2018.
Janis Keuper et al; Distributed Training of Deep Neural Networks: Theoretical and Practical Limits of Parallel Scalability; Dec. 2016.
Jeffrey Dean et al; Large Scale Distributed Deep Networks; Google Inc, Mountain View, CA.
Kai Wei et al; How to Intelligently Distribute Training Data to Multiple Compute Nodes: Distributed Machine Learning via Submodular Partitioning. University of Washington.
Nikko Strom; Scalable Distributed DNN Training Using Commodity GPU Cloud Computing; Amazon.com.
Run MXNet on Multiple CPU/GPUs with Data Parallelism; https://Mxnet.Incubator.Apache.Org; Mar. 19, 2018.
Surat Teerapittayanon; Distributed Deep Neural Networks over the Cloud, the Edge and End Devices; 2017.
TensorFlow; https://www.tensorflow.org; Mar. 7, 2018.
Why MXNet? http://Mxnet.Incubator.Apache.Org; Mar. 7, 2018.
Aditya Devarakonda et al.; Adaptive Batch Sizes for Training Deep Neural Networks; Dec. 6, 2017.
Alexandros Koliousis et al.; Crossbow: Scaling Deep Learning with Small Batch Sizes on Multi-GPU Servers; Jan. 8, 2019.

* cited by examiner

COORDINATED HETEROGENEOUS PROCESSING OF TRAINING DATA FOR DEEP NEURAL NETWORKS

TECHNICAL FIELD

This disclosure relates to the field of machine learning, and in particular, to Deep Neural Networks (DNNs).

BACKGROUND

DNNs are used for a wide range of tasks, such as Automatic Speech Recognition (ASR), computer vision, Natural Language Processing (NLP), Optical Character Recognition (OCR), etc. It is not uncommon for DNNs to be trained via Graphics Processing Units (GPUs). For example, when a DNN is trained via supervised learning, a large number of parameters for the DNN are determined by iteratively processing a massive number of samples (e.g., millions of samples) via a GPU. The training process may take a single machine months or years to complete. Thus, those who design DNNs often utilize distributed training techniques where multiple GPUs residing on multiple machines handle the training in parallel. In distributed training, GPUs may become desynchronized during the training process, which results in different samples within the training data being processed a different number of times by the end of training. This is referred to herein as "epoch desynchronization." Epoch desynchronization is undesirable, as it may result in parameters determined for the DNN becoming inaccurate. If the parameters are inaccurate, additional processing time is required in order to re-train the DNN. This increases both the time and expense involved in training a DNN.

SUMMARY

Embodiments described herein enhance processing by machines that perform distributed parallel processing of training data for a DNN. Specifically, samples within a set of training data may be allocated to machines based on the GPU processing powers of those machines so that the training data is processed for a desired number of epochs. One technical benefit is that samples within the training data are processed the same number of times, which prevents the DNN from being mis-trained or otherwise needing to undergo retraining. These techniques may also help to increase the overall speed of the training process.

One embodiment is a system that includes a memory configured to store samples of training data for a Deep Neural Network (DNN), and a distributor. The distributor identifies a plurality of work servers provisioned for training the DNN by processing the samples via a model of the DNN, receives information indicating Graphics Processing Unit (GPU) processing powers at the work servers, determines differences in the GPU processing powers between the work servers based on the information, and allocates the samples among the work servers based on the differences.

In a further embodiment, the distributor is configured to determine throughputs of the work servers, to select batch sizes for the work servers based on the throughputs, and to report the batch sizes. Each batch size defines a number of the samples in a batch for simultaneous processing by one of the work servers.

In a further embodiment, the distributor is configured to dynamically determine the throughputs, and to adjust the batch sizes based on the throughputs during training of the DNN.

In a further embodiment, the system further includes at least one revision element configured to receive input from one of the work servers upon completion of processing of a batch of the samples at the one of the work servers, to determine adjustments to the DNN based on the input, and to report the adjustments to the work servers for updating the model of the DNN.

In a further embodiment, the distributor is configured to determine an integer number of epochs of training to perform on the DNN. The distributor is configured to allocate the samples among the work servers so that the integer number of the epochs will be completed but not exceeded during training.

In a further embodiment, at least one of the samples comprises an image.

In a further embodiment, at least one of the samples comprises a sound file.

An additional embodiment is a method that includes identifying a plurality of work servers provisioned for training a Deep Neural Network (DNN) by processing samples of training data via a model of the DNN, receiving information indicating Graphics Processing Unit (GPU) processing powers at the work servers, determining differences in the GPU processing powers between the work servers based on the information, and allocating the samples among the work servers based on the differences.

Another additional embodiment is a non-transitory computer readable medium embodying programmed instructions which, when executed by a processor, are operable for performing a method. The method includes identifying a plurality of work servers provisioned for training a Deep Neural Network (DNN) by processing samples of training data via a model of the DNN, receiving information indicating Graphics Processing Unit (GPU) processing powers at the work servers, determining differences in the GPU processing powers between the work servers based on the information, and allocating the samples among the work servers based on the differences.

Another additional embodiment is a system that comprises a means for storing samples of training data for a Deep Neural Network (DNN), and a means for distribution. The means for distribution identifies a plurality of work servers provisioned for training the DNN by processing the samples via a model of the DNN, receives information indicating Graphics Processing Unit (GPU) processing powers at the work servers, determines differences in the GPU processing powers between the work servers based on the information, and allocates the samples among the work servers based on the differences.

Other illustrative embodiments may be described below.

DESCRIPTION OF THE DRAWINGS

Some embodiments are now described, by way of example only, and with reference to the accompanying drawings. The same reference number represents the same element or the same type of element on all drawings.

DESCRIPTION OF EMBODIMENTS

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
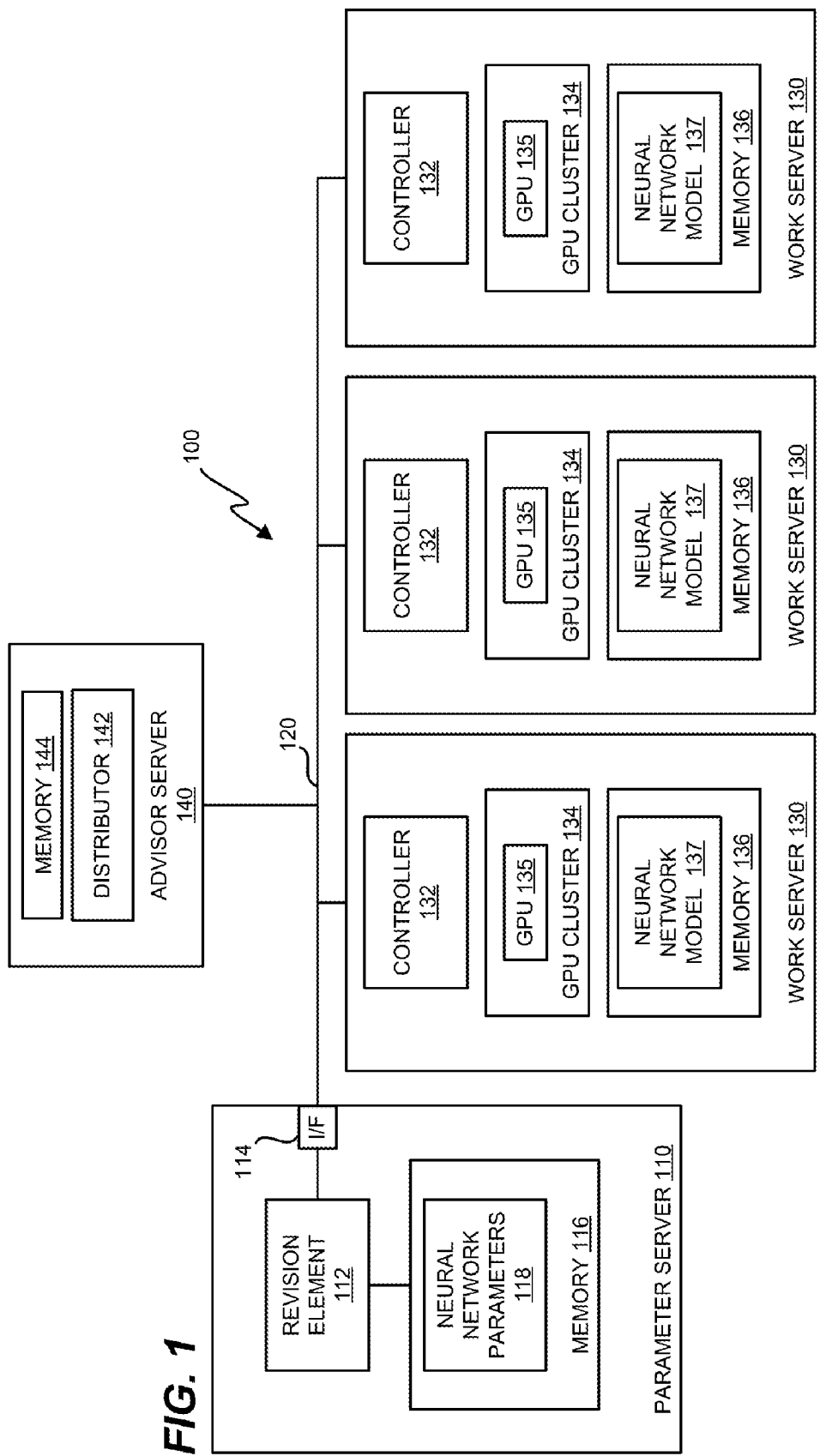
FIG. 1 is a block diagram of a neural network training system in an illustrative embodiment.

FIG. 1 is a block diagram of a neural network training system 100 in an illustrative embodiment. Neural network training system 100 may comprise any suitable combination of computers for training a DNN based on a set of training data. Training of a DNN may be performed by processing samples of training data via the DNN in order to make determinations. For example, a DNN reviewing a sample in the form of an image may attempt to assign a category to the image (e.g., "animal," "car," "boat," etc.), or a DNN reviewing a sample in the form of a sound may attempt to assign a category to the sound (e.g., "voice," "music," "nature," etc.). The DNN is then modified based on the accuracy of its determinations. The DNN makes determinations for new samples after it has been modified, as part of an iterative process. In this manner, the DNN is adjusted over time until a desired level of accuracy has been achieved. For example, the training process may involve processing millions of samples, and may involve iteratively adjusting the DNN thousands of times in order to increase the accuracy of determinations made by the DNN.

FIG. 1 illustrates a neural network training system 100 that includes work servers 130, parameter server 110, and advisor server 140. A work server 130 is an element comprising any suitable circuitry, hardware, or means for processing samples and making determinations for those samples based on a DNN. In this embodiment, each work server 130 comprises a controller 132, a GPU cluster 134, and a memory 136. A controller 132 comprises any suitable circuitry, hardware, or means for controlling the manner in which samples are processed. A GPU cluster 134 comprises any suitable circuitry, hardware, or means for utilizing a neural network model 137 of a DNN in order to make determinations about samples. Each GPU cluster 134 includes one or more GPUs 135. A GPU 135 comprises any suitable graphics processing unit. A GPU cluster 134 may use a neural network model 137 and GPUs 135 to categorize samples or assign labels to samples. Neural network models 137 comprise suitable information in memory describing how the DNN makes determinations for samples. The properties of these samples (e.g., their actual categories or labels) are known a priori, and hence the accuracy of each determination made by GPU cluster 134 for these samples may be calculated. Work servers 130 score the accuracy of the determinations made by neural network models 137 for the DNN as samples are being processed. Memory 136 comprises any suitable circuitry, hardware, or means for storing instructions for operation of work server 130.

While three work servers 130 are shown in this embodiment, any number of work servers 130 may be utilized. Furthermore, work servers 130 may have different numbers and types of GPUs 135 within their respective GPU clusters 134.

Advisor server 140 comprises any suitable circuitry, hardware, or means for distributing samples of training data among the work servers 130. In this embodiment advisor server 140 is configured to manage the training process for a DNN by allocating samples of training data to individual work servers 130. Samples are allocated in that they are reserved for processing solely by a specific work server 130. Advisor server 140 allocates samples among work servers 130 such that each work server 130 completes processing of its allocated samples at the same time. Specifically, advisor server 140 allocates samples among work servers 130 based on the GPU processing powers of those work servers 130. This prevents epoch desynchronization from occurring, as will be described below.

Advisor server 140 may also determine a batch size for each work server 130. A "batch" is a set of samples that have been allocated to a work server 130 and that are processed simultaneously at the GPU cluster 134 of the work server 130 for the purposes of making determinations and/or calculating accuracy. A "batch size" is the number of allocated samples that will be processed simultaneously by a given work server 130 at a point in time. For example, a work server 130 having a batch size of eight may process eight of its allocated samples at a time. The work server 130 may continue processing batches until all of its allocated samples have been processed, and then may optionally initiate another round of processing for its allocated samples.

In this embodiment, advisor server 140 includes distributor 142 and memory 144. Distributor 142 comprises any suitable circuitry, hardware, or means for managing the operations of advisor server 140 and allocating samples among work servers 130. Memory 144 comprises any suitable circuitry, hardware, or means for storing instructions for operation of advisor server 140.

Neural network training system 100 further comprises parameter server 110. Parameter server 110 comprises revision element 112 and memory 116. Revision element 112 comprises any suitable circuitry, hardware, or means for adjusting how the DNN makes determinations, based on input from work servers 130. Memory 116 comprises any suitable circuitry, hardware, or means for storing neural network parameters 118. Parameter server 110 is coupled via communication channel 120 with work servers 130. Parameter server 110 may be implemented on the same or a different machine/computer than advisor server 140 or worker servers 130.

Revision element 112 adjusts how the DNN makes determinations by altering neural network parameters 118. Examples of neural network parameters 118 include connection weights between nodes in the DNN. Parameter server 110 also includes memory 116, which stores neural network parameters 118 for retrieval by work servers 130 via interface (I/F) 114. For example, these neural network parameters 118 may be used by each work server 130 to update a locally stored neural network model 137.

One method of training a DNN is known as synchronous training. In synchronous training, work servers 130 process batches of samples in order to make determinations. Upon completion of a batch, a work server 130 pauses in order to wait for other work servers 130 to complete their respective batches. However, this means that valuable processing cycles may be wasted and the overall training time for the DNN may be undesirably increased.

An alternative method of training a DNN is referred to as asynchronous training. In asynchronous training, work servers 130 process batches of samples in order to make determinations. However, work servers 130 would not pause for other work servers 130 before proceeding to process a next batch of samples. Parameters for a DNN are not guaranteed to converge during asynchronous training.

Processing samples in prior systems would result in problems related to the training process. Even in synchronous training, epoch desynchronization may occur. An "epoch" refers to all samples in a training set having been processed once. It is often desirable to train a DNN for a specified number of epochs. However, when samples are allocated/siloed equally (or not allocated at all) to different work servers 130 during training, then if one work server 130 is faster than another work server 130, it may process its samples a larger number of times than the slower work server 130 when synchronous training is performed. This leads to an issue known as "epoch desynchronization" where a precise number of epochs of training is not performed for the DNN, because the samples have not been processed the same number of times during training.

Further compounding this issue, processing samples in prior systems may cause certain samples to be weighted more heavily. For example, because certain samples are processed more times than others, they may be used more often to adjust neural network parameters 118 and hence have more influence in adjusting the DNN. This is also a problem because such adjustments may be non-reversible. Hence, epoch desynchronization may cause a DNN to need retraining, and potentially results in a need for training to be started from the beginning all over again.

Neural network training system 100 beneficially overcomes the above issues relating to epoch desynchronization, because it uses advisor server 140 to dynamically allocate different numbers of samples to work servers 130 based on the GPU processing power at each work server 130. Furthermore, advisor server 140 may assign different batch sizes to the worker servers 130 based on their GPU processing powers so that the worker servers 130 complete their respective batches in about the same time. This allows the work servers 130 to proceed without pause, beneficially increasing training speed for the DNN. The size of each batch may be statically or dynamically determined by advisor server 140 as described above. In one embodiment, advisor server 140 allocates samples and assigns batch sizes such that the number of samples allocated to a worker server 130 is evenly divisible by its batch size, leaving no remainder.

Further details of the operation of neural network training system 100 will be discussed with regard to FIG. 2. Assume, for this embodiment, that a DNN has been created and awaits training. In this embodiment, the DNN comprises multiple layers of nodes, and neural network parameters 118 indicate numerical values for connection weights between nodes at the DNN. In order to train the DNN to accurately perform processing, the weights are adjusted in an iterative process.

Figure 2:
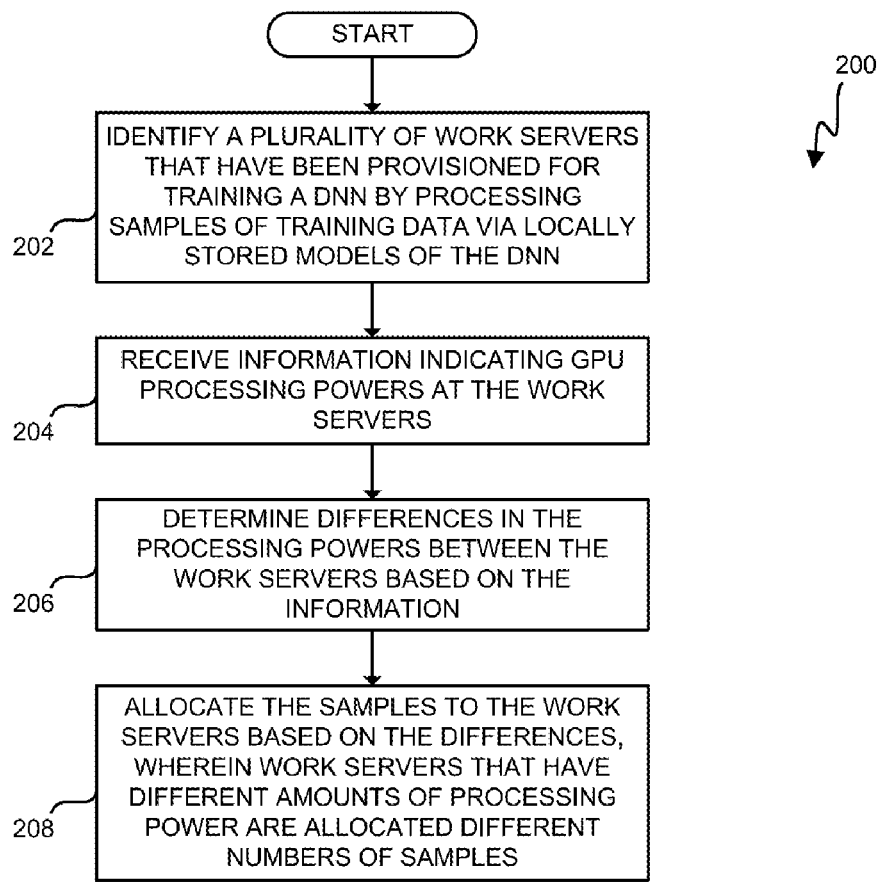
FIG. 2 is a flowchart illustrating a method for training a DNN in an illustrative embodiment.
Figure 3:
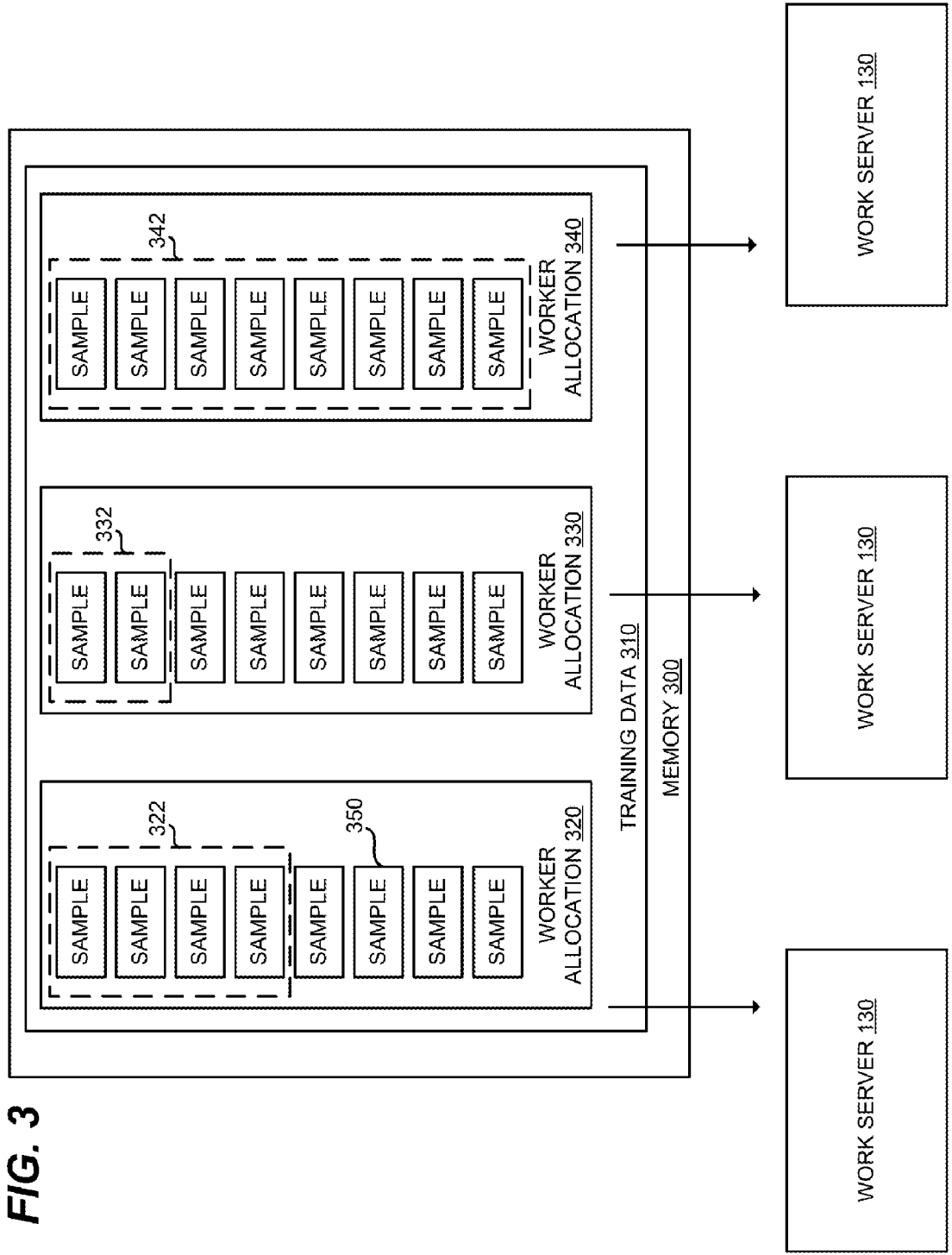
FIG. 3 is a block diagram of a set of training data in an illustrative embodiment.

FIG. 2 is a flowchart illustrating a method 200 for training a DNN in an illustrative embodiment. The steps of method 200 are described with reference to neural network training system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, distributor 142 identifies a plurality of work servers 130 that have been provisioned for training the DNN. For example, work servers 130 may be selected by a user or indicated in memory 144. In step 204, distributor 142 receives information indicating GPU processing powers at the work servers 130 (e.g., the processing powers of the GPUs 135 within the GPU cluster 134 at each work server 130). GPU processing power of a GPU cluster may be based on the speed of individual processor cores, the number of processor cores, etc. GPU processing power may be measured in raw cycles per second, etc. GPU processing power in this case is the processing power of the GPUs 135 that will be making determinations based on the samples. Hence, in at least one embodiment, the speed of a CPU for a controller 132 is not considered (i.e., because controller 132 does not directly process samples to make DNN-based determinations). GPU processing power may correspond with an expected throughput in terms of samples per second, or a previously measured throughput. Advisor server 140 may further send a query to work servers 130 in order to determine their specifications.

In step 206, distributor 142 determines differences in the GPU processing powers between the work servers 130, based on the information received in step 204. For example, one work server 130 may have a GPU cluster 134 that enables much faster processing than the GPU cluster 134 of another work server 130. In step 208, distributor 142 allocates the samples among the work servers 130 based on the differences in GPU processing power. This is performed such that work servers 130 that have different amounts of GPU processing power are allocated different numbers of samples. For example, distributor 142 may allocate twice as many samples to a work server 130 if the work server 130 has twice as much GPU processing power as another work server 130. Allocation of samples to work servers 130 may comprise transmitting the allocated samples to the work servers 130, or transmitting instructions identifying the allocated samples to the work servers 130.

Distributor 142 may also select a batch size for each work server 130 based on its GPU processing power and/or amount of memory. For example, advisor server 140 may consider available memory at GPU cluster 134 (e.g., more than ninety percent) as a constraint when determining batch size.

Work servers 130 process samples in batches in order to make determinations, calculate the accuracy of those determinations, and report accuracy information to parameter server 110. Parameter server 110 receives this accuracy information and updates neural network parameters 118. These neural network parameters 118 are used by work servers 130 to update their neural network models 137, and processing of a next batch is initiated.

Because batch sizes assigned to the work servers 130 vary based on GPU processing power, the work servers 130 are also expected to complete their batches at the same time. If batch sizes were equal, a GPU cluster 134 with more processing power would complete its batch more quickly, while a GPU cluster 134 with less processing power would process its batch more slowly. However, the batch sizes for each work server 130 have already been determined by advisor server 140 such that GPU clusters 134 finish processing batches at roughly the same time. In further embodiments, advisor server 140 may determine batch sizes prior to training, and/or dynamically.

The completion of processing of one batch at each work server 130, and any updating of parameters at the DNN based on that processing, is referred to as an iteration. At the completion of one iteration, processing continues to a next iteration as work servers 130 each process a next batch of samples. Processing may continue in this manner so that the samples of training data have been processed once. Completion of processing for the set of training data (i.e., so that the samples in the training data have been processed the same number of times) is referred to as an epoch.

Training may continue for multiple epochs as desired in order to increase the accuracy of the DNN. Depending on the number of desired epochs, number of work servers 130, and number of samples used for training, the steps described herein may be iterated multiple times (e.g., hundreds or even thousands of times). Eventually, advisor server 140 completes training of an integer number of epochs so that each sample in the training data has been processed the integer number of times (e.g., an integer number of times, such as ninety times). At this point, training has been completed and weights at the DNN have been set to desired values.

Figure 4:
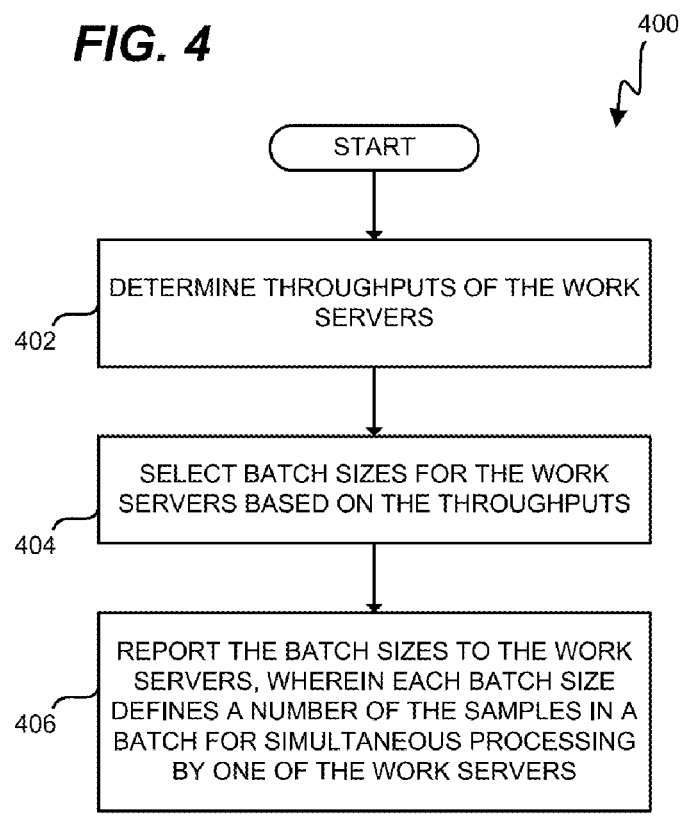
FIGS. 4-8 are flowcharts illustrating additional details for training a DNN in an illustrative embodiment.

FIGS. 4-8 are flowcharts illustrating additional details for training a DNN in an illustrative embodiment. Specifically, FIG. 4 is a flowchart illustrating selecting batch sizes based on throughput in an illustrative embodiment. According to method 400, distributor 142 determines throughputs of the work servers 130 (e.g., in terms of a number of samples per unit time) in step 402. Distributor 142 further selects batch sizes for the work servers 130 based on the throughputs in step 404. For example, work servers 130 having higher throughputs may be assigned accordingly higher batch sizes. In step 406, distributor 142 reports the batch sizes to the work servers 130. As mentioned previously, each batch size defines a number of the samples in a batch for simultaneous processing by one of the work servers 130.

Figure 5:
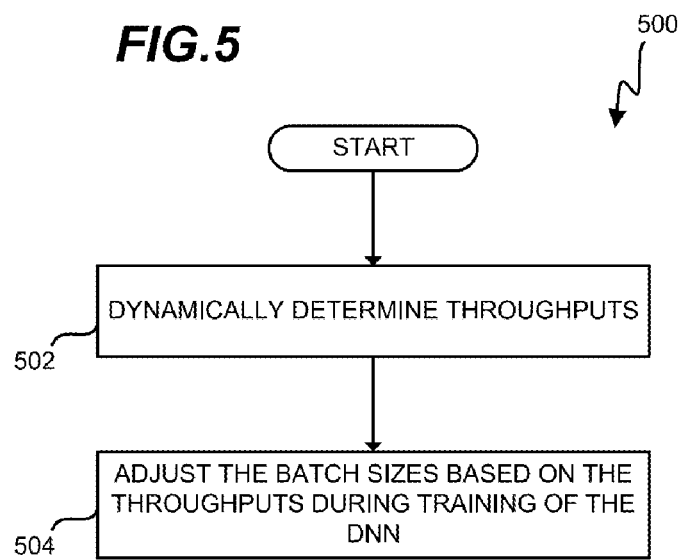

FIG. 5 is a flowchart illustrating dynamically selecting batch sizes based on throughput in an illustrative embodiment. According to method 500, distributor 142 dynamically determines the throughputs in step 502. For example, distributor 142 may determine throughputs of the work servers 130 at the end of each iteration. In step 504, distributor 142 adjusts the batch sizes based on the throughputs during training of the DNN. Hence, while the DNN is actively being trained, throughputs may be adjusted by advisor server 140.

Figure 6:
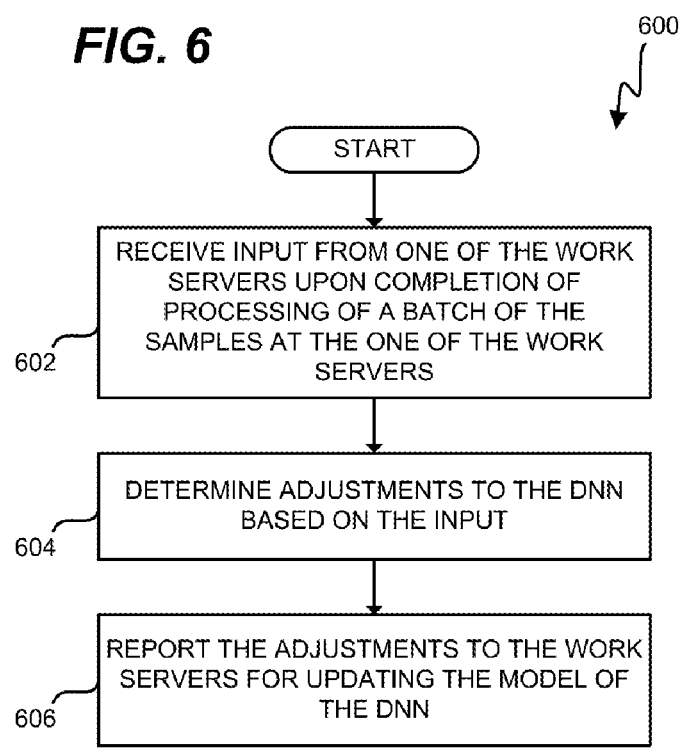

FIG. 6 is a flowchart illustrating adjustments performed by parameter server 110 in an illustrative embodiment. According to method 600, in step 602, revision element 112 receives input from one of the work servers 130 upon completion of processing of a batch of the samples at the one of the work servers. For example, revision element 112 may receive gradients from each of work servers 130 at the completion of an iteration. According to step 604, revision element 112 determines adjustments to the DNN based on the input. For example, revision element 112 may adjust weighted connections between nodes at the DNN (as indicated in neural network parameters 118) based on the input. In step 606, revision element 112 reports the adjustments to the work servers 130 via I/F 114 for updating the model of the DNN.

Figure 7:
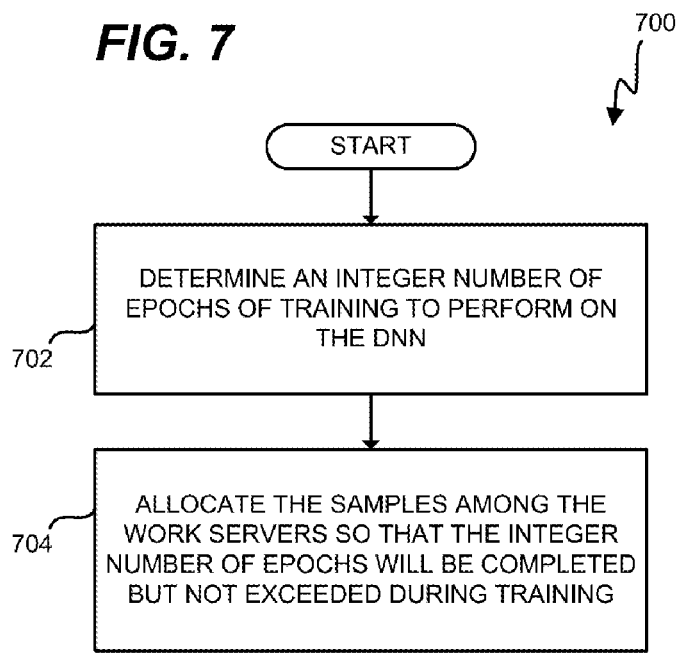

FIG. 7 is a flowchart illustrating allocation of samples in order to provide a desired number of epochs of training in an illustrative embodiment. According to method 700, distributor 142 determines an integer number of epochs of training to perform on the DNN in step 702. Distributor 142 further allocates the samples among the work servers 130 so that the integer number of epochs will be completed but not exceeded during training, in step 704.

Figure 8:
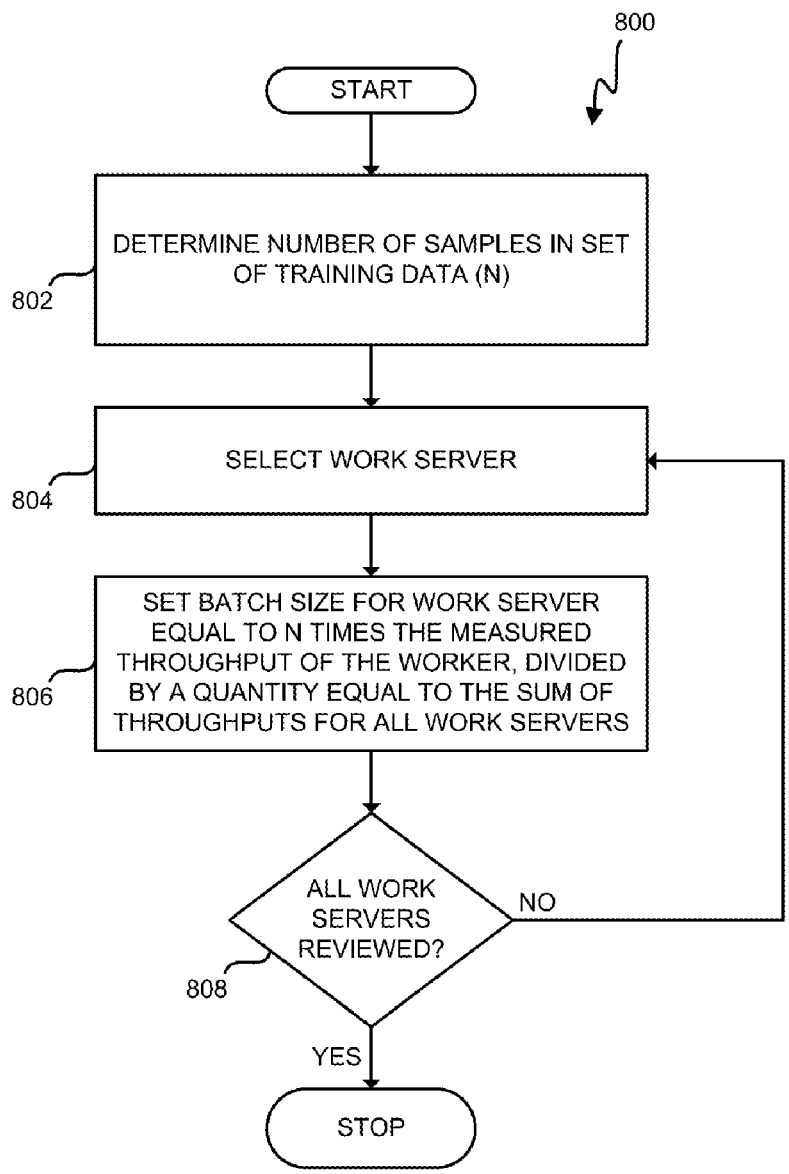

FIG. 8 is a flowchart illustrating selection of batch sizes for training a DNN in an illustrative embodiment. For example, method 800 illustrates additional features of step 204 of method 200 in an illustrative embodiment. According to method 800, in step 802 advisor server 140 determines the total number of samples (also known as a "total batch" size) N that will be used to train the DNN. For example, N may be hundreds of thousands or millions of samples so as to allow parallel training of the DNN by a large number of work servers. In step 804, advisor server 140 selects a work server 130. Advisor server 140 proceeds to select a batch size for that work server 130. This may be performed according to the following equation, where $w_i$ is the throughput of the work server 130 that has been selected (i.e., a number of samples processed over a given period of time), $b_i$ is the number of samples determined for the batch, and j is a number that iterates over the number of work servers 130 used for training the DNN.

$$b_i = \frac{N \cdot w_i}{\sum_j w_j} \quad (1)$$

Phrased another way, the batch size for a work server 130 may be set equal to N times the measured throughput of the work server 130, divided by a quantity equal to the sum of throughputs for all work servers (step 806). In step 808, if not all work servers 130 have been reviewed for batch size, a new work server 130 may be selected. The process may be performed for all work servers 130, and may be performed at the start of training. The process may also be performed after each iteration, periodically over time, etc.

Figure 9:
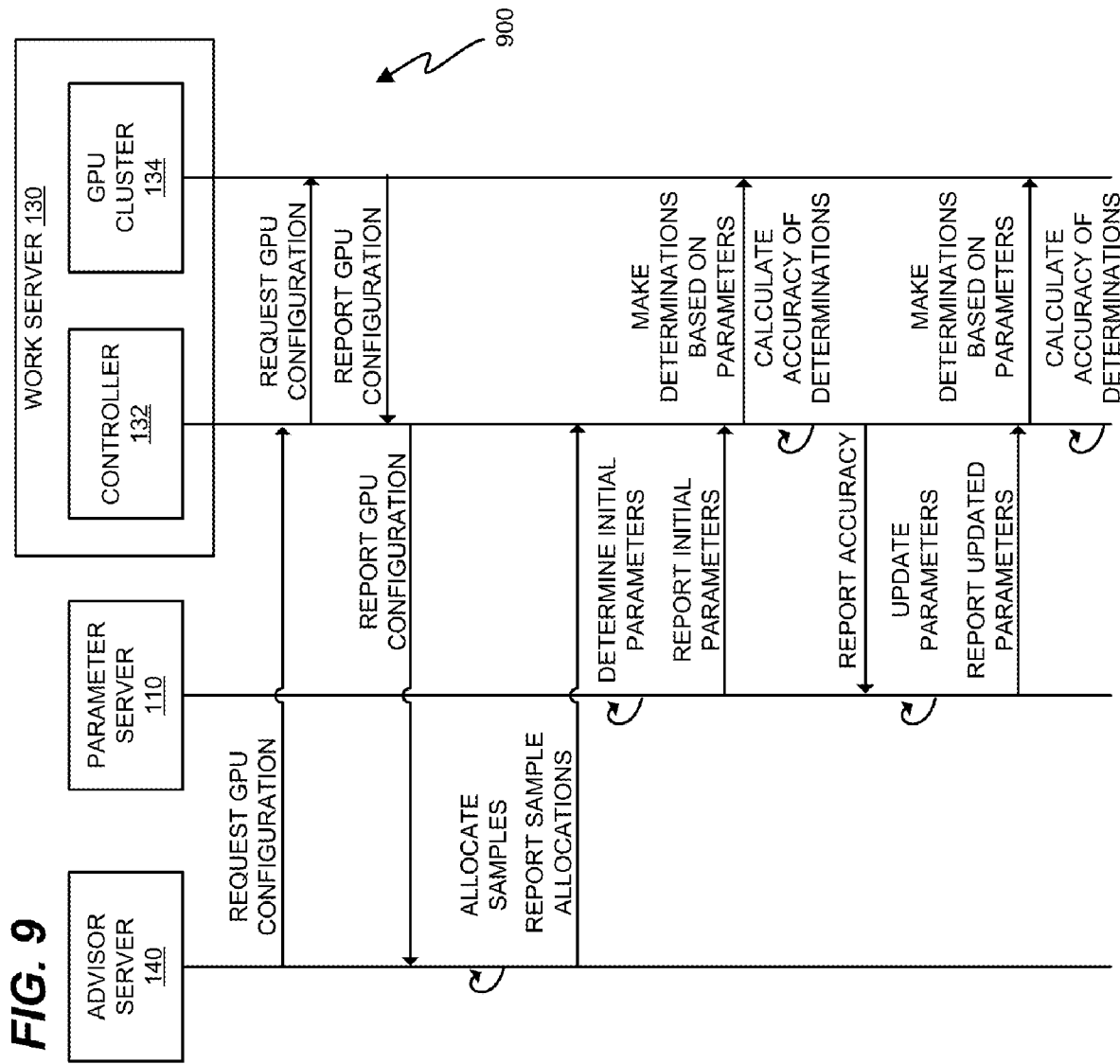
FIG. 9 is a message diagram illustrating communications between various computing elements during training of a DNN in an illustrative embodiment.

FIG. 9 is a message diagram 900 illustrating communications between various computing elements during training of a DNN in an illustrative embodiment. As shown in FIG. 5, advisor server 140 may initiate the process by requesting a GPU configuration from each work server 130. A controller 132 at each work server 130 proceeds to query GPU cluster 134 for data describing the speed, amount of memory, model number, etc., of each GPU 135 in the GPU cluster. Upon receiving this data, work server 130 reports the GPU configuration data back to advisor server 140. At this point in time, advisor server 140 estimates a throughput of each GPU cluster 134, based on the size in memory for each sample, GPU processing power, and other factors. Advisor server 140 further allocates samples to each work server 130 based on a GPU processing power for that work server 130.

Advisor server 140 may also determine a batch size for each work server 130. The sample allocations and/or batch size are reported to controller 132, which retrieves or otherwise tracks the location of its allocated samples. Parameter server 110 proceeds to determine initial parameters for the DNN, and reports these parameters to controller 132. Controller 132 then operates GPU cluster 134 on a batch of samples to make determinations for the batch of samples based on neural network model 137. Controller 132 further calculates the accuracy of the determinations. For example, controller 132 may determine a value for each determination (or sample) via a loss function. Controller 132 may further determine gradients based on these loss function values, and report the gradients to parameter server 110, which updates its parameters. Although not illustrated, controller 132 may also report throughput parameters (e.g., idle time, duration spent processing the batch, free GPU memory, etc.) to advisor server 140. Advisor server 140 may then update a batch size for work server 130 if desired. The process continues for another iteration as work server 130, and any other work servers 130, process another batch of samples tailored to their amount of throughput.

EXAMPLES

In the following examples, additional processes, systems, and methods are described in the context of a system that trains DNNs.

Figure 10:
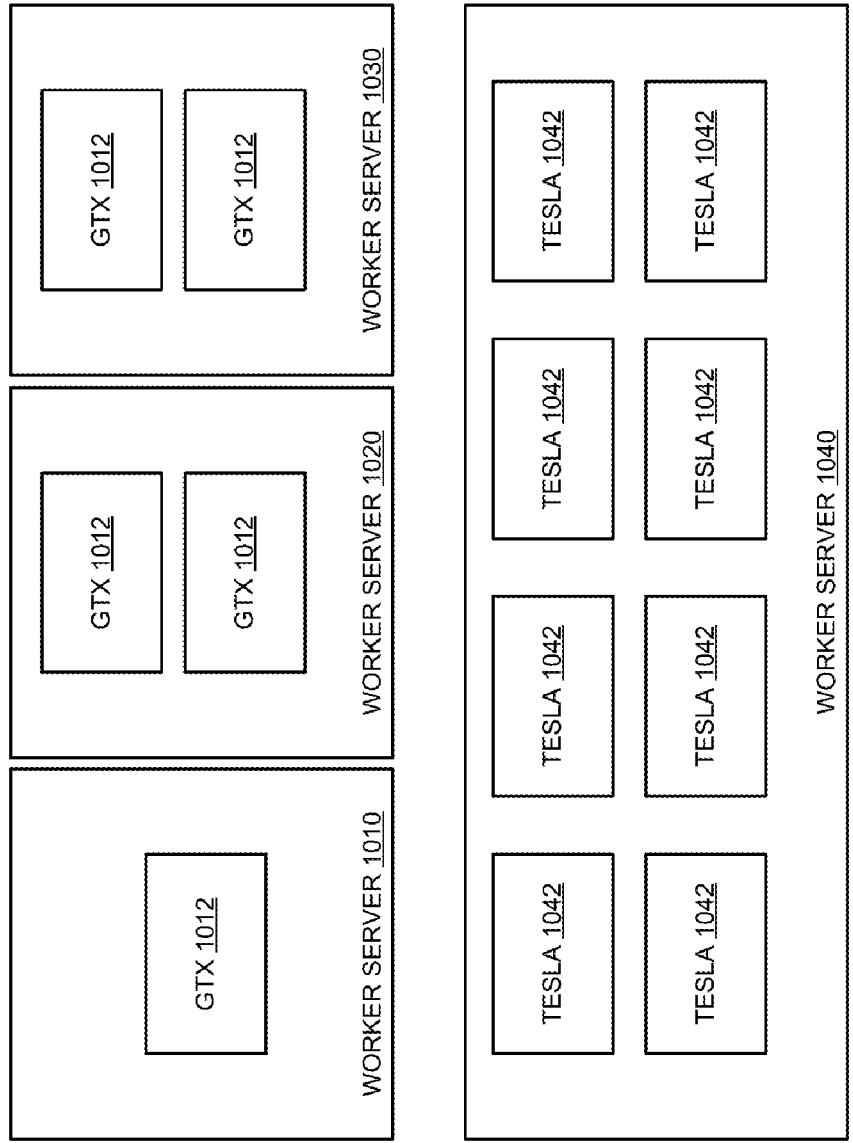
FIG. 10 is a block diagram of a set of work servers in an illustrative embodiment.

FIG. 10 is a block diagram of a set of work servers in an illustrative embodiment. According to FIG. 10, work server 10 has one GTX 1080Ti GPU ("GTX 1012"). Work server 1020 and 1030 each have two such GPUs. Furthermore, work server 1040 has eight Tesla P100 GPUs ("TESLA 642"). To fully utilize all thirteen GPUs, it would be possible to implement thirteen separate subroutines that were each assigned a separate GPU. However, such an implementation necessarily increases overhead. The implementation of multiple subroutines at one machine also may cause the subroutines to adversely impact or otherwise interfere with each other. For instance, if eight subroutines ran independently on work server 640, there would be eight models (as opposed to one model), of parameters and gradient updates communicated to a parameter server at each iteration.

According to the example of FIG. 10, work servers 1010-1040 each implement one work server subroutine, and are assigned samples heterogeneously. For instance, work server 1010 may use one GPU and have a batch size of sixty-four, work server 1020 and work server 1030 may each use two GPUs and have a batch size of one-hundred and twenty-eight, and work server 1040 may use eight GPUs and have a batch size of five-hundred and twelve. Compared with the base case where every subroutine on each of thirteen GPUs uses the same batch size of sixty-four homogeneously, the heterogenous training process achieves a substantial improvement (e.g., 71%) in completion time.

When performing training which is desired to terminate after a specified number of epochs, the work servers together cover the samples of the training data once (e.g., exactly once) in an epoch. In homogeneous distributed training, the dataset can simply be partitioned equally among the work servers. This means that the work servers finish their samples with a same number of iterations in every epoch. To guarantee this property for heterogeneous distributed training, for each epoch the training data is partitioned among the work servers in proportion to their batch sizes. New work servers and/or new GPU devices can be introduced at the boundary of epochs, or alternatively dynamic adjustment may be performed on the partitions to reflect the changes in the ratio of work server batch sizes.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. A system comprising:
a memory configured to store samples of training data for a Deep Neural Network (DNN); and
a distributor configured to identify a plurality of work servers provisioned for training the DNN by processing the samples via models of the DNN, to receive information indicating Graphics Processing Unit (GPU) processing powers at the work servers, to determine differences in the GPU processing powers between the work servers based on the information, and to allocate the samples among the work servers based on the differences, wherein:
the distributor is configured to determine throughputs of the work servers during training of the DNN, to dynamically select batch sizes for individual ones of the work servers between epochs during training of the DNN based on the throughputs, and to report the selected batch sizes to the work servers in order to control how samples are processed by the work servers; and each batch size defines a number of the samples for processing by one work server.

2. The system of claim 1 wherein:
the processing of a batch is performed by a GPU cluster of a work server.

3. The system of claim 1 wherein:
each of the work servers provides a gradient for updating parameters of the DNN.

4. The system of claim 2 further comprising:
at least one modifier configured to receive input from the work servers upon completion of processing a number of samples equal to the batch sizes the work servers, to determine adjustments to the DNN based on the input, and to report the adjustments to the work servers for updating the models of the DNN.

5. The system of claim 1 wherein:
the distributor is configured to determine an integer number of epochs of training to perform on the DNN; and
the distributor is configured to allocate the samples among the work servers so that the integer number of the epochs will be completed but not exceeded during training.

6. The system of claim 1 wherein:
at least one of the samples comprises an image.

7. The system of claim 1 wherein:
at least one of the samples comprises a sound file.

8. A method comprising:
identifying a plurality of work servers provisioned for training a Deep Neural Network (DNN) by processing samples of training data via models of the DNN;
receiving information indicating Graphics Processing Unit (GPU) processing powers at the work servers;
determining differences in the GPU processing powers between the work servers based on the information;
allocating the samples among the work servers based on the differences;
determining throughputs of the work servers during training of the DNN;
dynamically selecting batch sizes for individual ones of the work servers between epochs during training of the DNN based on the throughputs; and
reporting the selected batch sizes to the work servers in order to control how samples are processed by the work servers, wherein each batch size defines a number of the samples for processing by one work server.

9. The method of claim 8 further comprising:
processing a batch via a GPU cluster of a work server.

10. The method of claim 8 wherein:
each of the work servers provides a gradient for updating parameters of the DNN.

11. The method of claim 9 further comprising:
receiving input from the work servers upon completion of processing a number of samples equal to the batch sizes the work servers;
determining adjustments to the DNN based on the input; and
reporting the adjustments to the work servers for updating the models of the DNN.

12. The method of claim 8 further comprising:
determining an integer number of epochs of training to perform on the DNN; and
allocating the samples among the work servers so that the integer number of epochs will be completed but not exceeded during training.

13. The method of claim 8 wherein:
at least one of the samples comprises an image.

14. The method of claim 8 wherein:
at least one of the samples comprises a sound file.

15. A non-transitory computer readable medium embodying programmed instructions which, when executed by a processor, are operable for performing a method comprising:
identifying a plurality of work servers provisioned for training a Deep Neural Network (DNN) by processing samples of training data via models of the DNN;
receiving information indicating Graphics Processing Unit (GPU) processing powers at the work servers;
determining differences in the GPU processing powers between the work servers based on the information;
allocating the samples among the work servers based on the differences;
determining throughputs of the work servers during training of the DNN;
dynamically selecting batch sizes for individual ones of the work servers between epochs during training of the DNN based on the throughputs; and
reporting the selected batch sizes to the work servers in order to control how samples are processed by the work servers, wherein each batch size defines a number of the samples for processing by one work server.

16. The medium of claim 15 wherein the method further comprises:
processing a batch via a GPU cluster of a work server.

17. The medium of claim 15 wherein:
each of the work servers provides a gradient for updating parameters of the DNN.

18. The medium of claim 16 wherein the method further comprises:
receiving input from the work servers upon completion of processing a number of samples equal to the batch sizes the work servers;
determining adjustments to the DNN based on the input; and
reporting the adjustments to the work servers for updating the models of the DNN.

19. The medium of claim 15 wherein the method further comprises:
determining an integer number of epochs of training to perform on the DNN; and
allocating the samples among the work servers so that the integer number of epochs will be completed but not exceeded during training.

20. The medium of claim 15 wherein:
at least one of the samples comprises an image.

* * * * *